(12) United States Patent
Kim

(10) Patent No.: US 10,443,917 B2
(45) Date of Patent: Oct. 15, 2019

(54) MACHINE FOR SHAVING AND PRESSING ICE CREAM

(71) Applicant: Kwangyoung Kim, Jeollabuk-do (KR)

(72) Inventor: Kwangyoung Kim, Jeollabuk-do (KR)

(73) Assignee: ESCALAB AGRICULTURAL CO., LTD., Jeollabuk-Do (KR)

( * ) Notice: Subject to any disclaimer, the term of this patent is extended or adjusted under 35 U.S.C. 154(b) by 249 days.

(21) Appl. No.: 15/545,640

(22) PCT Filed: Oct. 26, 2015

(86) PCT No.: PCT/KR2015/011335
§ 371 (c)(1),
(2) Date: Jul. 21, 2017

(87) PCT Pub. No.: WO2016/122087
PCT Pub. Date: Aug. 4, 2016

(65) Prior Publication Data
US 2018/0014554 A1  Jan. 18, 2018

(30) Foreign Application Priority Data

Jan. 26, 2015 (KR) .................. 10-2015-0012246
Feb. 13, 2015 (KR) .................. 10-2015-0022571

(51) Int. Cl.
*F25C 5/12* (2006.01)
*F25C 5/02* (2006.01)
*A23G 9/22* (2006.01)

(52) U.S. Cl.
CPC .............. *F25C 5/12* (2013.01); *A23G 9/22* (2013.01); *A23G 9/224* (2013.01); *F25C 5/02* (2013.01)

(58) Field of Classification Search
CPC .............. F25C 5/02; A23G 9/224; A23G 9/22
USPC ..................................... 241/DIG. 17
See application file for complete search history.

(56) References Cited

U.S. PATENT DOCUMENTS

| | | | | | |
|---|---|---|---|---|---|
| 2,627,377 | A | * | 2/1953 | Fletcher | F25C 5/12 241/280 |
| 2,852,201 | A | * | 9/1958 | Bert | F25C 5/12 241/92 |
| 2,853,243 | A | * | 9/1958 | Bert | B26D 1/29 241/278.1 |
| 3,679,140 | A | * | 7/1972 | Kaishita | B26D 1/00 241/95 |

(Continued)

FOREIGN PATENT DOCUMENTS

| | | |
|---|---|---|
| KR | 1020030005488 | 1/2003 |
| KR | 1020050005952 | 1/2005 |

(Continued)

*Primary Examiner* — Faye Francis
(74) *Attorney, Agent, or Firm* — IPLA P.A.; James E. Bame

(57) ABSTRACT

A machine for shaving and pressing ice cream, the machine being capable of: obtaining shaved ice cream having a uniform wave shape and roughness or softness desired by an ice cream eater, since a pressing plate is rotated and moved downwards by a rotary motor embedded in a motor fixing case of a shaving and pressing machine body part and the ascending and descending drive of a driving actuator, thereby easily shaving the ice cream contained in a container in multiple stages; and easily extracting soft ice cream by stopping the driving of the rotary motor and pressing semi-solid ice cream, contained in the container, by means of the descending of the pressing plate.

19 Claims, 8 Drawing Sheets

(56) References Cited

U.S. PATENT DOCUMENTS

| | | | | |
|---|---|---|---|---|
| 4,569,266 A * | 2/1986 | Ando | ............ | A23G 9/045 241/101.2 |
| 4,588,136 A * | 5/1986 | Homma | ............ | A23G 9/045 241/168 |
| 4,718,610 A * | 1/1988 | Gallaher | ............ | A23G 9/045 241/101.2 |
| 5,007,591 A * | 4/1991 | Daniels, Jr. | ............ | F25C 5/12 241/169.1 |
| 5,402,949 A * | 4/1995 | Berner | ............ | A23G 9/045 241/101.2 |
| 5,513,810 A * | 5/1996 | Lin | ............ | B26D 3/225 241/168 |
| 5,680,771 A * | 10/1997 | Yoo | ............ | A23G 9/045 241/DIG. 17 |
| 6,012,660 A * | 1/2000 | Colman | ............ | F25C 5/12 241/100 |
| 6,328,236 B1 * | 12/2001 | Upson | ............ | F25C 5/12 241/95 |
| 7,201,338 B2 * | 4/2007 | Nakato | ............ | A47J 43/042 241/100 |
| 7,264,187 B1 * | 9/2007 | Kolar | ............ | A23G 9/045 241/30 |
| 8,807,469 B2 * | 8/2014 | Sung | ............ | A47J 43/255 241/285.2 |
| 9,451,850 B2 * | 9/2016 | Sung | ............ | F25C 5/12 |
| 9,568,233 B2 * | 2/2017 | Liao | ............ | F25C 5/12 |
| 2006/0243838 A1 * | 11/2006 | Nakato | ............ | A47J 43/042 241/84 |

FOREIGN PATENT DOCUMENTS

| | | |
|---|---|---|
| KR | 1020140025203 | 3/2014 |
| KR | 1020140094163 | 7/2014 |
| KR | 1020140101198 | 8/2014 |

* cited by examiner

MACHINE FOR SHAVING AND PRESSING ICE CREAM

BACKGROUND

The present invention relates generally to a machine for shaving and pressing ice cream. More particularly, the present invention relates to a machine for shaving and pressing ice cream, in which a rotary motor provided in a motor fixing case of a body part, and a drive actuator are driven to rotate and move down a pressing plate, such that ice cream contained in a container is shaved in multiple stages, whereby it is possible to obtain rough or soft and uniform ice cream in a wave form desired by a user, and it is possible to easily dispense soft ice cream by stopping driving the rotary motor and pressing semisolid ice cream contained in the container by the pressing plate being moved down.

Generally known ice makers can make various kinds of edible ice such as ice cream and pieces of edible ice by freezing edible ice or ice powder with drinking water, juice, milk and juice mix, or a flavored drink according to the ice material using the refrigeration cycle.

Edible ice, which is frozen through an ice maker, is served in the form of a soft ice flakes by shaving a block of ice with a blade into snow-like flakes using an ice shaving machine.

In the case of a conventional ice shaving machine, a block of ice is broken into ice cubes, ice grains, ice flakes, or the like in accordance with the purpose, and the ice cubes, ice grains, ice flakes, or the like are put in drinks or fruit is mixed therewith to eat. Here, a protruding height of a blade is adjusted by a blade support mounted in the ice shaving machine such that the size of shaved ice varies in accordance with the purpose.

Meanwhile, a document of Korean Patent Publication No. 10-2014-0123322 discloses an electric ice shaving machine, which is configured such that an ice block is placed on an ice support plate and then the ice block is fast rotated by an ice fixture at an upper portion thereof, whereby the ice block is shaved by a blade of the ice support plate placed at a lower portion of the ice block. When the ice block is not shaved, the ice block is spaced apart from the ice support plate, so as to prevent the ice block from melting by frictional heat of the ice support plate.

As shown in FIG. 1, the technical configuration of the electric ice shaving machine is as follows: an ice support plate 20 is provided at a location, where a blade 21 is provided, of a middle lower portion of a main body 10; an ice shavings chamber 30 having an opening is provided with a lower portion of the ice support plate 20 to receive ice shavings shaved by the blade 21; and a rotating shaft 41 with an ice fixture 40 for fixing an ice block A fixed thereto is connected with a motor 46 at an upper portion of the main body 10, so as to be rotated downward.

Further, a drive chamber provided at an upper portion of the main body 10 is configured such that a lifting motor 44 with a worm gear 42 provided to a rotating shaft 41 is provided in the drive chamber, and after the ice fixture 40 is moved up by the lifting motor 44, the ice fixture 40 with an ice block A fixed by a separate rotary motor 46 is rotated at a high speed, thereby shaving the ice block A. Meanwhile, a spaced support plate 50 is disposed to be withdrawable within a predetermined range in the ice support plate 20; the spaced support plate 50 is integrally formed on an upper surface of the ice support plate 20, and a vertically movable plate 60 is provided at a lower portion of the ice support plate; an operating lever 70 is provided at a lower portion of the vertically movable plate 60 to adjust vertical motion of the vertically movable plate 60; and a compression spring 28 is elastically provided at a bottom of the ice support plate 20 to push the vertically movable plate 60 downward.

Accordingly, in the state where the ice block A is placed on the upper surface of the ice support plate 20 of the main body 10, the ice fixture 40 being moved down by operation of the lifting motor 44 fixes the ice block A, and in the state where driving of the lifting motor 44 is stopped, the ice fixture 40 is moved down by operation of the rotary motor 46 and the ice block A is shaved by the blade 21. Here, in the state the spaced support plate 50 withdrawably provided on the upper surface of the ice support plate 20 does not come out from the upper surface of the ice support plate 20 and the vertically movable plate 60 is moved down by a downward force generated by the compression spring 28, ice shaving is performed, and then the ice shaving is stopped by stopping the rotation of the ice fixture 40. When the vertically movable plate 60 is moved up, by cutting off the operating power of the ice fixture 40 by a detection sensor 80, it is possible to prevent the ice support plate 20 protruding from the spaced support plate 50 from being damaged. Meanwhile, when the ice block is spaced upward apart from the ice support plate 20 by the spaced support plate 50, it is possible to prevent the ice block from melting by frictional heat of the ice support plate.

However, the electric ice shaving machine is problematic in that since the separate vertically movable plate 60 is provided at the lower portion of the ice support plate 20 by interposing the compression spring 28, and the separate spaced support plate 50 protruding from the ice support plate 20 is provided to prevent the ice block from melting by frictional heat of the ice support plate, the main body of the ice shaving machine has a complex structure that is difficult to manufacture; since the lifting motor 44 with the worm gear 42 provided thereon is provided in the rotating shaft 41 such that the ice fixture 40 is moved up and down by the lifting motor 44, the ice fixture 40 is continuously moved down even after the entire ice block A fixed to the ice fixture 40 is shaved, whereby the blade 21 and the ice fixture 40 may be damaged; and since the ice block is shaved by manipulation of the rotary motor 46 which is manually operated, it is difficult to uniformly shave the ice block, and it is difficult to obtain soft ice shavings like ice cream.

SUMMARY OF THE INVENTION

Accordingly, the present invention has been made keeping in mind the above problems occurring in the related art, and the present invention is intended to propose a machine for shaving and pressing ice cream, in which a rotary motor provided in a motor fixing case of a body part, and a drive actuator are driven to rotate and move down a pressing plate, such that ice cream contained in a container is shaved in multiple stages, whereby it is possible to obtain rough or soft and uniform ice cream in a wave form desired by a user, it is possible to easily dispense soft ice cream by stopping driving the rotary motor and pressing semisolid ice cream contained in the container by the pressing plate being moved down, it is possible to easily shave or dispense ice cream in a container since a vertically movable coupler of the motor fixing case is smoothly moved up and down through coupler support fixed in a body part, it is possible to prevent the pressing plate and the ice shaving blade from being damaged by stopping driving the rotary motor by sensing a change in pressing pressure of a pressing plate provided in a spring upon completion of shaving the frozen ice cream, it is possible to obtain ice cream shavings desired by a user by selectively rotating the frozen ice cream in multiple stages by manipulation of the controller, and it is possible to easily disassemble and clean an ice shaving blade after a blade fixture is separated from a support plate.

In order to achieve the above object, according to some aspect of the present invention, there is provided a machine for shaving and pressing ice cream, the machine including: a body part constituted by a mount part at an upper portion thereof, a support part at a middle portion thereof, and a base plate at a lower portion thereof; a guide means provided at a front of the mount part; a motor fixing case vertically slidably provided in the guide means, with a rotary motor provided therein, the rotary motor being configured such that a pressing plate is mounted to a rotating shaft at a lower end of the rotating shaft; a drive actuator provided at a second side of the motor fixing case, and configured to move up and down the motor fixing case with the rotary motor provided therein; a support plate fixedly connected to a lower portion of the mount part such that the support plate is coaxially aligned with the pressing plate and a container containing ice cream is placed on the support plate; a blade fixture provided in the support plate, with a blade provided therein so as to shave frozen ice cream contained in the container; and a controller provided on an outer surface of the mount part of the body part, and configured to control operation of the rotary motor and the drive actuator.

Further, the guide means provided at the front of the mount part may be configured such that a first side surface of the motor fixing case is provided with a vertically movable coupler with a guide rail provided at each of opposite sides thereof to longitudinally protrude, the front of the mount part of the body part, as a first side of the vertically movable coupler, is integrally provided with a coupler support with a rail channel provided at each of opposite ends of the coupler support, and the vertically movable coupler is coupled to the coupler support such that the motor fixing case is moved up and down.

Further, a vertically movable coupler may be provided on each of opposite sides of the motor fixing case, as the guide means provided at the front of the mount part, and a coupler support may be provided on each of opposite sides of the front of the body part to be coupled with the vertically movable coupler.

Further, the pressing plate may be provided with a protruding pressing piece at a lower portion thereof so as to press and fix the container receiving ice cream therein.

Further, the drive actuator may be provided with a bar extending at an upper portion thereof in a vertical direction, with a cylinder interposed therebetween, and the motor fixing case may be provided with a connecting bar extending at an upper portion thereof in a vertical direction, the connecting bar being connected with the bar of the drive actuator through a connecting piece.

Further, the motor fixing case with the rotary motor provided therein may be provided with a protruding case connector at an upper portion thereof, with a lower portion of the connecting bar inserted into the case connector, to be elastically supported by a spring.

Meanwhile, the connecting bar elastically provided in the case connector with the interposition of the spring may be provided with a pressure sensor at a lower portion thereof, to transmit a signal to the controller to stop driving the rotary motor by sensing a change in pressing pressure upon completion of shaving the frozen ice cream.

Further, the rotary motor may rotate the frozen ice cream in multiple stages by manipulation of the drive actuator, to obtain rough or soft and thin ice cream shavings desired by a user.

Further, in order for pressing pressure to be exerted against the pressing plate, a connection structure between the rotary motor and the pressing plate may include: an elastic coupler provided between the rotating shaft connected with the rotary motor and the pressing plate rotated while pressing the frozen ice cream; a shaft coupling hole formed at an upper portion of the elastic coupler to allow a lower portion of the rotating shaft to be inserted and locked thereto; a support coupling hole formed at a lower portion of the elastic coupler to allow the pressing plate to be locked thereto by being inserted into the hole at a pressing plate support; a spring elastically provided in the support coupling hole to elastically support the pressing plate; and the pressing plate support integrally provided at an upper portion of the pressing plate rotated while pressing the frozen ice cream to support the pressing plate.

Here, the rotating shaft connected with the rotary motor may be provided with a flat coupling portion at each of opposite sides of a lower portion thereof, such that the rotating shaft is fixed to the elastic coupler by using a coupling bolt after the coupling portion is closely engaged with the shaft coupling hole of the elastic coupler.

Further, the pressing plate support integrally extending from the pressing plate to support the pressing plate may be configured to be inserted into the support coupling hole formed at the lower portion of the elastic coupler, and fixed thereto by using a coupling pin.

Further, the elastic coupler may be formed with a longitudinally oblong hole at each of opposite outer sides of the elastic coupler to communicate with the support coupling hole, such that the pressing plate along with the pressing plate support is moveable up and down within a predetermined range.

Further, the spring elastically provided in the support coupling hole to elastically support the pressing plate may be in a form of a coil spring or a leaf spring.

Furthermore, the pressing plate pressing the frozen ice cream may be provided with a plurality of pressing protrusions at a lower portion thereof, so as to press a lower cover of a container, the lower cover being provided with a notch on an outer circumferential surface thereof such that the lower cover is separated from the container containing the frozen ice cream by pressing pressure of the pressing plate.

In order to achieve the above object, according to some aspects of the present invention, there is provided a machine for shaving and pressing ice cream, the machine including: a body part constituted by a mount part at an upper portion thereof, a support part at a middle portion thereof, and a base plate at a lower portion thereof; a guide means provided at a front of the mount part; a motor fixing case vertically slidably provided in the guide means, with a rotary motor provided therein, the rotary motor being configured such that a pressing plate is mounted to a rotating shaft at a lower end of the rotating shaft; a drive actuator provided at a second side of the motor fixing case, and configured to move up and down the motor fixing case with the rotary motor provided therein; a support plate fixedly connected to a lower portion of the mount part such that the support plate is coaxially aligned with the pressing plate and a container containing ice cream is placed on the support plate; a container support 290 detachably provided in the support plate 160, and configured to receive a container 300' containing soft ice cream therein while being placed in the support plate 160 and to be opened at a lower portion thereof, such that the ice cream in the container is dispensed by being pressed; and a controller provided on an outer surface of the mount part of the body part, and configured to control operation of the rotary motor and the drive actuator.

According to a machine for shaving and pressing ice cream of the present invention having the above-described characteristics, it is advantageous in that a rotary motor provided in a motor fixing case of a body part, and a drive actuator are driven to rotate and move down a pressing plate, such that ice cream contained in a container is shaved in multiple stages, whereby it is possible to obtain rough or soft and uniform ice cream in a wave form desired by a user, it is possible to easily dispense soft ice cream by stopping driving the rotary motor and pressing semisolid ice cream contained in the container by the pressing plate being moved down, it is possible to easily shave or dispense ice cream in a container since a vertically movable coupler of the motor fixing case is smoothly moved up and down by a coupler support fixed in a body part, it is possible to prevent the pressing plate and the ice shaving blade from being damaged by stopping driving the rotary motor by sensing a change in pressing pressure of a pressing plate provided in a spring upon completion of shaving the frozen ice cream, it is possible to obtain ice cream shavings desired by a user by selectively rotating the frozen ice cream in multiple stages by manipulation of the controller, and it is possible to easily disassemble and clean an ice shaving blade after a blade fixture is separated from a support plate.

DETAILED DESCRIPTION OF THE INVENTION

Reference will now be made in greater detail to an exemplary embodiment of a machine for shaving and pressing ice cream of the present invention.

Figure 1:
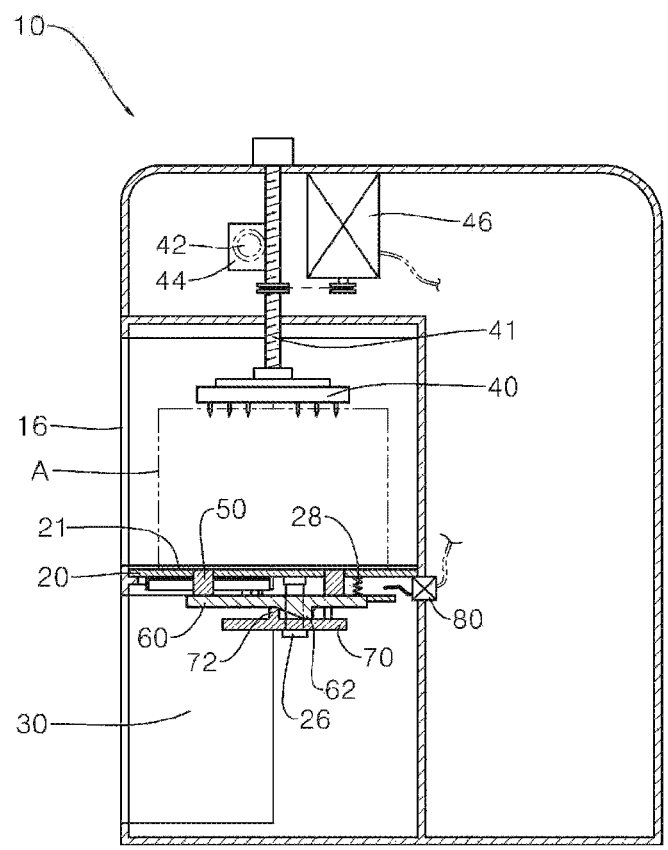
FIG. 1 is a side cross-sectional structural view showing a conventional electric ice shaving machine.
Figure 2:
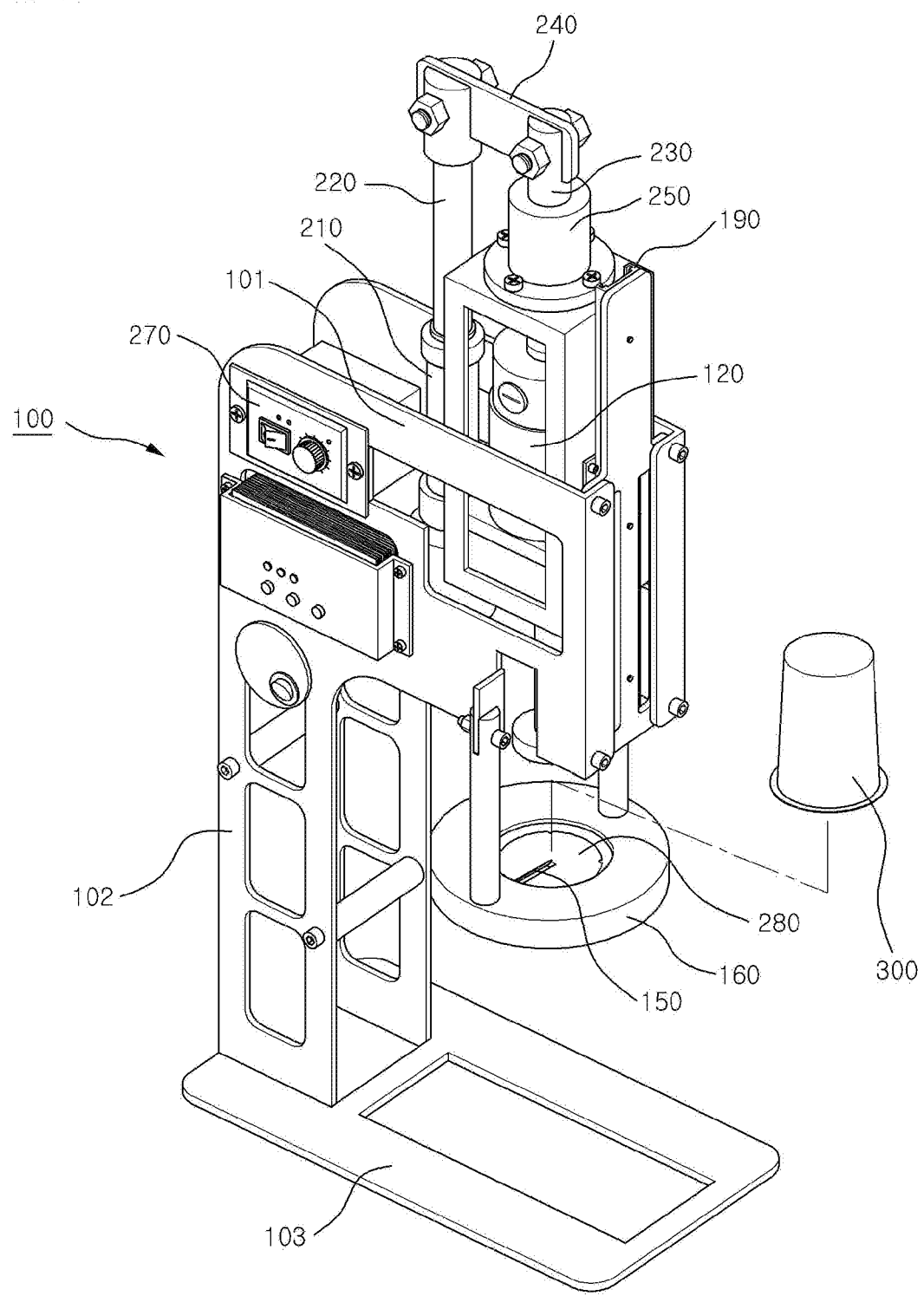
FIG. 2 is a schematic perspective view showing a machine for shaving and pressing ice cream according to the present invention.
Figure 3:
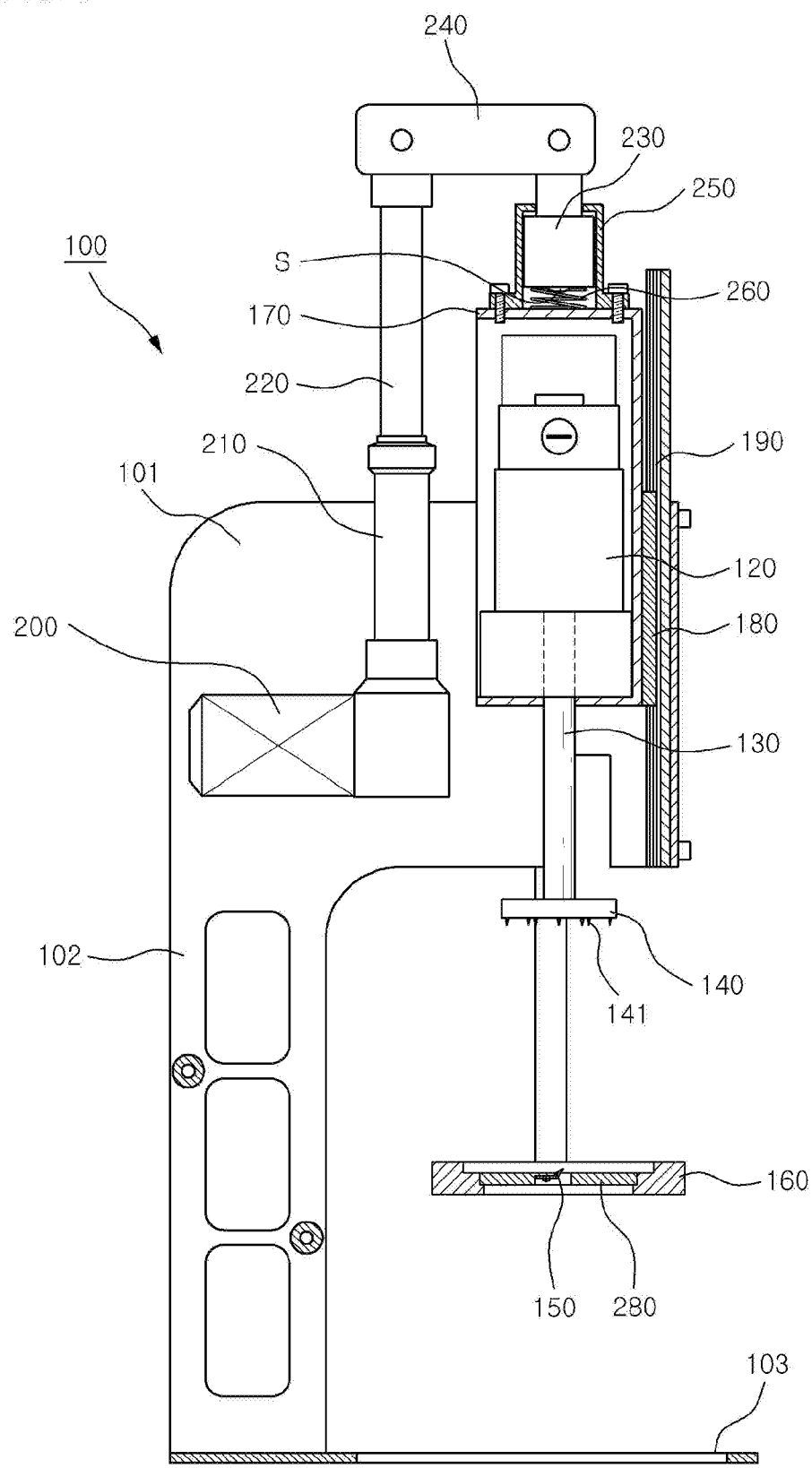
FIG. 3 is a side cross-sectional structural view showing an assembled state of the machine for shaving and pressing ice cream of the present invention.
Figure 4:
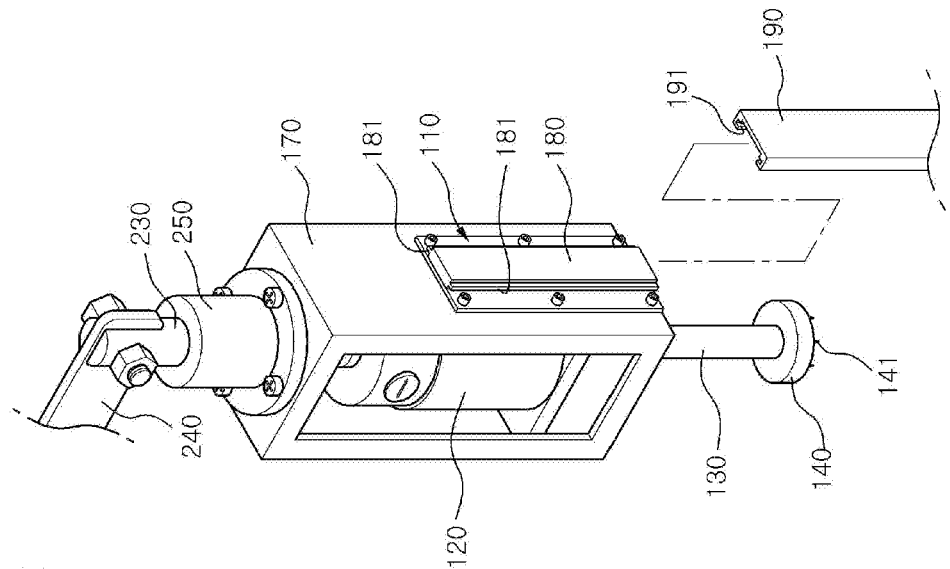
FIG. 4 is an exploded perspective view of essential portions showing a vertically movable coupler and a coupler support of a motor fixing case, in which a rotary motor is provided, of the present invention.
Figure 5:
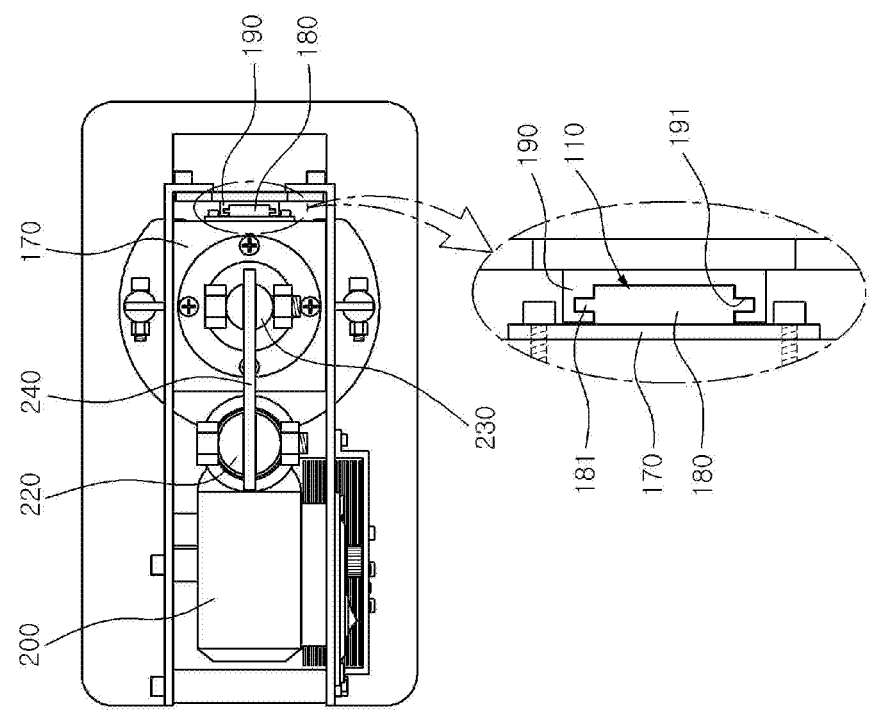
FIG. 5 is a structural plan view showing the machine for shaving and pressing ice cream of the present invention.
Figure 6:
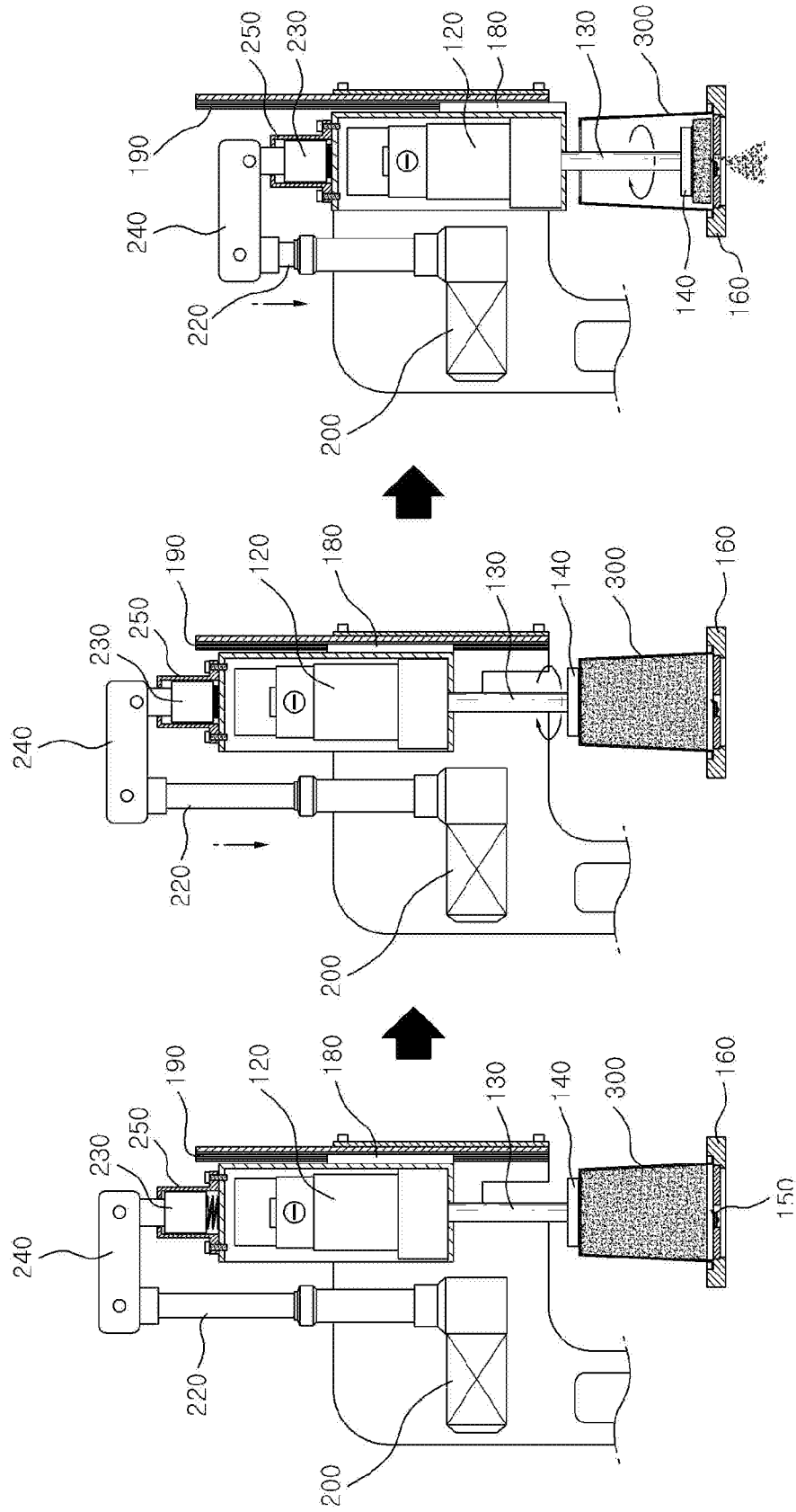
FIG. 6 is an operational schematic view showing a state where ice cream is shaved by the machine for shaving and pressing ice cream of the present invention.

FIG. 2 is a schematic perspective view showing a machine for shaving and pressing ice cream according to the present invention; FIG. 3 is a side cross-sectional structural view showing an assembled state of the machine for shaving and pressing ice cream of the present invention; FIG. 4 is an exploded perspective view of essential portions showing a vertically movable coupler and a coupler support of a motor fixing case, in which a rotary motor is provided, of the present invention; FIG. 5 is a structural plan view showing the machine for shaving and pressing ice cream of the present invention; FIG. 6 is an operational schematic view showing a state where ice cream is shaved by the machine for shaving and pressing ice cream of the present invention. Detailed description of the present invention is as follows.

In other words, in the machine for shaving and pressing ice cream, a body part 100, which is constituted by a mount part 101 at an upper portion thereof, a support part 102 at a middle portion thereof, and a base plate 103 at a lower portion thereof, is configured such that a rotary motor 120 rotating a container 300 containing ice cream, and a pressing plate 140 provided with a protruding pressing piece 141 at a lower portion thereof so as to press a lower cover of the container 300 containing the ice cream are connected with each other in the body part by interposing a rotating shaft 130 therebetween at a lower portion of the rotary motor 120. Here, a support plate 160 is fixedly connected to a lower portion of the mount part 101 of the body part 100 such that the support plate is coaxially aligned with the pressing plate 140 and a container 300 containing the ice cream is placed on the support plate.

Here, the rotary motor 120 is fixedly provided in a motor fixing case 170 that is provided at a first side of the mount part 101 of the body part 100, wherein the a first side surface of the motor fixing case 170 is provided with a vertically movable coupler 180 with a guide rail 181 provided at each of opposite sides thereof to longitudinally protrude, and a first side of the body part 110, as a first side of the vertically movable coupler 180, is integrally provided with a coupler support 190 with a rail channel 191 provided at each of opposite ends of the coupler support, thereby constituting a guide means 110.

The vertically movable coupler 180 may be provided on each of opposite sides of the motor fixing case 170, as the guide means 110, and a coupler support 190 may be also provided on each of opposite sides of the front of the body part 100 to be coupled with the vertically movable coupler 180.

Further, a drive actuator 200 is provided at a second side of the motor fixing case 170 such that the motor fixing case 170 along with the rotary motor 120 is move up and down, a bar 220 extends at an upper portion of the drive actuator 200 in a vertical direction by interposing a cylinder 210 therebetween, and a connecting bar 230 extends at an upper portion of the motor fixing case 170 in a vertical direction, whereby the connecting bar 230 is connected with the bar 220 of the drive actuator 200 through a connecting piece 240.

Meanwhile, the motor fixing case 170 with the rotary motor 120 provided therein is provided with a protruding case connector 250 at an upper portion thereof, and a lower portion of the connecting bar 230 is inserted into the case connector 250 to be elastically supported by a spring 260.

Further, a controller 270 is provided on an outer surface of the mount part 101 of the body part 100, and configured to control operation of the rotary motor 120 and the drive actuator 200. Meanwhile, the connecting bar 230 elastically provided in the case connector 250 with the interposition of the spring 260 is provided with a pressure sensor S at a lower portion thereof, to transmit a signal to the controller 270 to stop driving the rotary motor 120 by sensing a change in pressing pressure upon completion of shaving the frozen ice cream.

Further, a blade fixture 280 with a blade 150 provided therein is detachably provided in the support plate 160 fixedly connected to the lower portion of the mount part 101 of the body part 100 to be coaxially aligned with the pressing plate 140, so as to shave frozen ice cream contained in the container 300.

Reference will now be made in detail to operation and advantages of the present invention configured as described above.

As shown in FIGS. 2 to 6, when the frozen ice cream in the container 300 rotated by driving of the rotary motor 120 provided in the body part 100, which is constituted by the mount part 101 at an upper portion of the machine for shaving and pressing ice cream, the support part 102 at a middle portion thereof, and the base plate 103 at a lower portion thereof, is shaved by the blade 150 in multiple stages of the rotary motor 120 from one to five to obtain rough or soft, fine and uniform ice cream in a slurry form, the rotary motor 120 rotating the container 300 containing the frozen ice cream is connected to the pressing plate 140 provided with the protruding pressing piece 141 at the lower portion thereof by interposing the rotating shaft 130 therebetween at the lower portion of the rotary motor, whereby a lower cover of the container 300 containing the frozen ice cream is separated and the container is fixedly pressed by the protruding pressing piece 141 of the pressing plate 140, the frozen ice cream is shaved by the blade 150 provided in the support plate 160 while the container 300 containing the frozen ice cream is rotated in multiple stages in response to the rotation of the rotary motor 120.

Here, the container 300 containing the frozen ice cream is provided with the lower cover formed with a separation groove at an inner circumferential surface thereof so as to be separated from the container by being pressed by the pressing piece 141, such that the frozen ice cream is shaved while being rotated along with the container with the lower cover being separated therefrom.

Further, the rotary motor 120 fixedly provided in the motor fixing case 170 provided at the first side of the mount part 101 of the body part 100 is configured such that the first side surface of the motor fixing case 170 is provided with the vertically movable coupler 180 with the guide rail 181 provided at each of opposite sides thereof to longitudinally protrude, and the first side of the body part 100, as the first side of the vertically movable coupler 180, is provided with the guide means 110 integrally provided with the coupler support 190 with the rail channel 191 formed at each of opposite ends of the coupler support, whereby the motor fixing case 170 with the rotary motor 120 provided therein is moved up and down while smoothly and stably sliding through the coupler support 190 fixed in the body part 100 by the vertically movable coupler 180 provided at the first side thereof, to shave the frozen ice cream by rotating the same.

Here, the vertically movable coupler 180 provided in the motor fixing case 170, as the guide means 110, provided at the first side of the mount part 101 may be provided on each of opposite sides of the motor fixing case 170, and a coupler support 190 coupled with the vertically movable coupler 180 may be also provided on each of opposite sides of the front of the body part 100, such that the motor fixing case 170 is further supported.

Meanwhile, the drive actuator 200 is provided on an outer surface of the mount part 101 of the body part 100, to move up and down the motor fixing case 170 along with the rotary motor 120. The drive actuator 200 is provided with a bar 220 extending at an upper portion thereof in a vertical direction, with a cylinder 210 interposed therebetween, and the motor fixing case 170 is provided with a connecting bar 230 extending at an upper portion thereof in a vertical direction, the connecting bar 230 being connected with the bar 220 of the drive actuator 200 through a connecting piece 240, whereby the bar 220 is moved up and down by the operation of the cylinder 210 of the drive actuator 200, and the rotary motor 120 and the pressing plate 140 are moved up and down.

Further, the motor fixing case 170 with the rotary motor 120 provided therein is provided with a protruding case connector 250 at an upper portion thereof, with a lower portion of the connecting bar 230 inserted into the case connector 250, to be elastically supported by a spring 260, whereby while being moved down by the connecting bar 230, the pressing plate 140 pressing the lower cover of the container 300 containing the frozen ice cream elastically presses the frozen ice cream along with the lower cover, so it is possible to obtain rough or soft and uniform ice cream in a wave form desired by a user by selectively driving the rotary motor 120 from one to five stages.

Further, the controller 270 is provided on an outer surface of the body part 100 of the ice shaving machine 100, to control operation of the rotary motor 120 in multiple stages, such that the frozen ice cream is rotated along with the drive actuator 200 and the lower cover of the container 300 containing the frozen ice cream, whereby it is possible to obtain rough or soft and thin ice cream shavings desired by a user by selectively rotating the frozen ice cream in multiple stages from one to five by manipulation of the controller 270.

In addition, the connecting bar 230 elastically provided in the case connector 250 with the interposition of the spring 260 is provided with a pressure sensor S at a lower portion thereof, to transmit a signal to the controller 270 to stop driving the rotary motor 120 by sensing a change in pressing pressure upon completion of shaving the frozen ice cream, whereby it is possible to prevent the pressing plate 140 and the ice shaving blade 150 from being damaged.

Further, the blade fixture 280 with the blade 150 provided therein to shave frozen ice cream is detachably provided in the support plate 160, which is fixedly connected to a lower portion of the mount part 101 of the body part 100 such that the support plate is coaxially aligned with the pressing plate 140, whereby it is possible to easily disassemble and clean the ice shaving blade 120 after the blade fixture 280 is separated from the support plate 160, and it is possible to keep the blade fixture 280 provided with the blade 150 clean.

Figure 7:
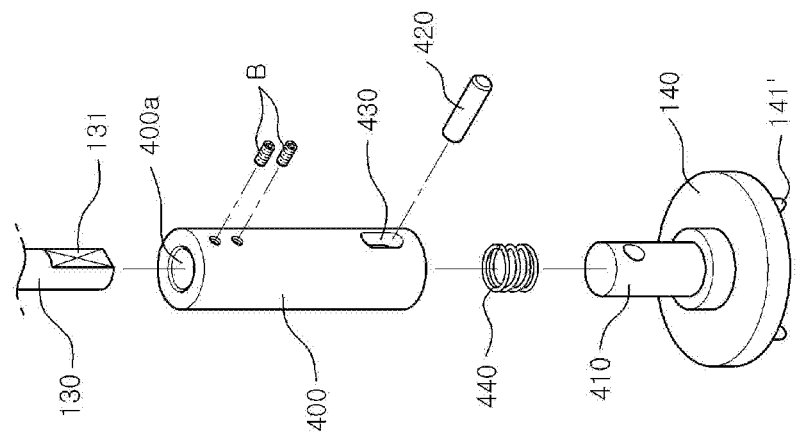
FIG. 7 is an exploded perspective view of essential portions showing a connection structure between a pressing plate and a rotating shaft connected by an elastic coupler of the machine for shaving and pressing ice cream according to another embodiment of the present invention.
Figure 8:
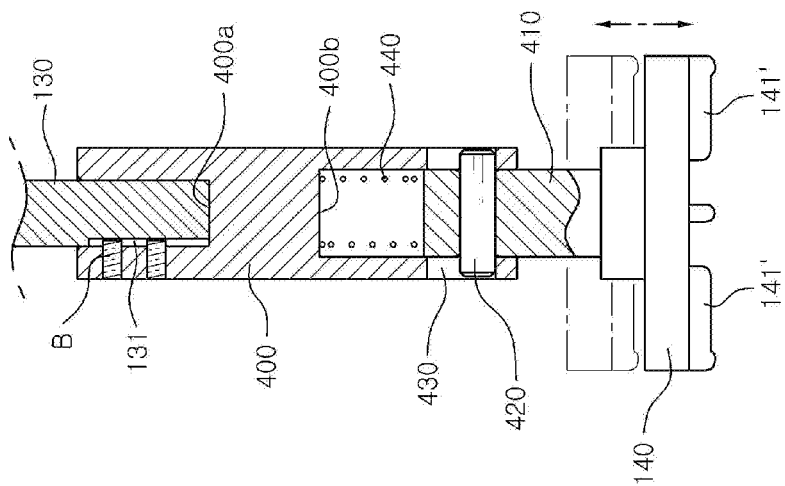
FIG. 8 is a cross-sectional structural view of essential portions showing an assembled state of FIG. 7.
Figure 9:
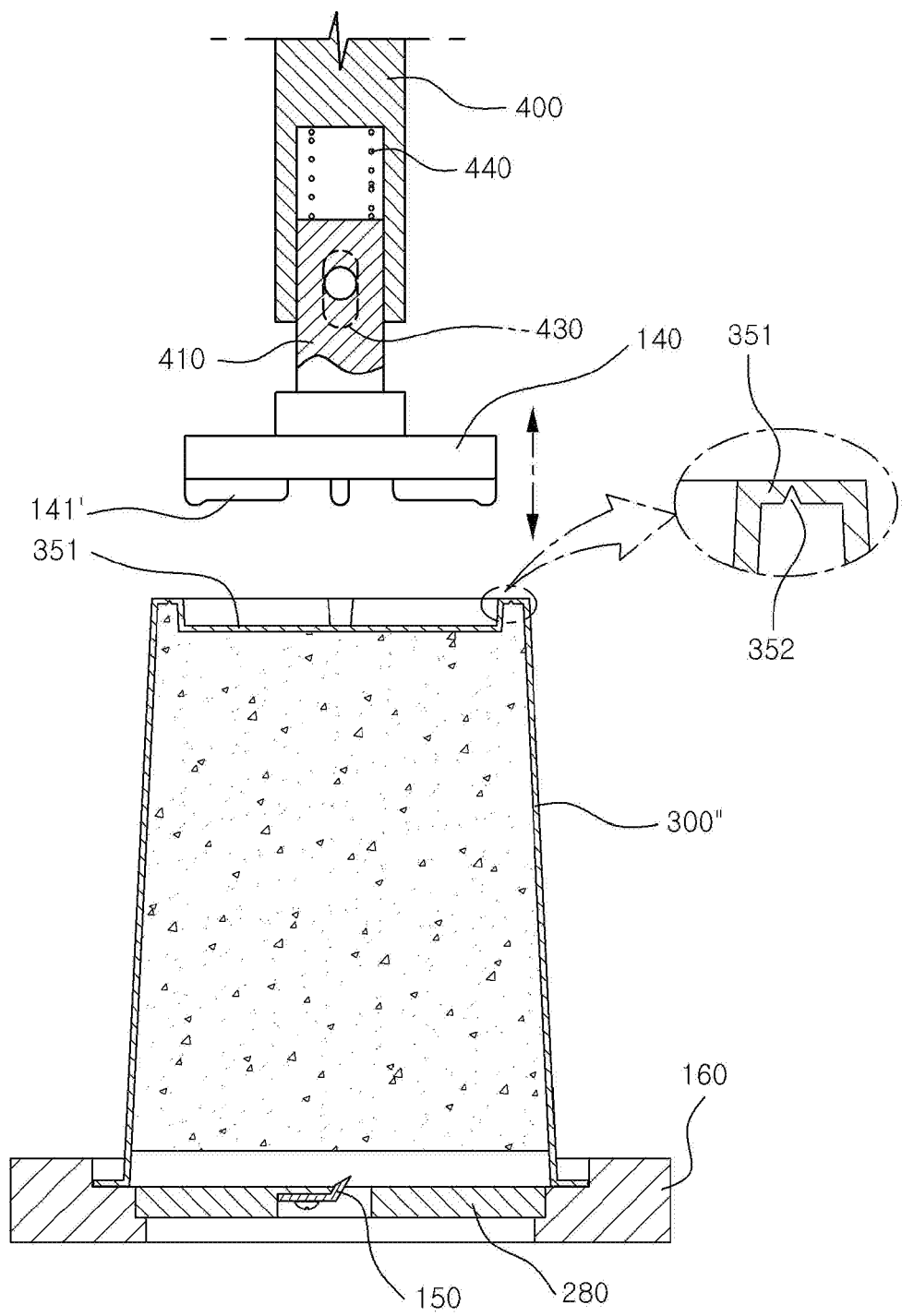
FIG. 9 is a cross-sectional schematic view showing a connection structure between a pressing plate and a rotating shaft connected by an elastic coupler of the machine for shaving and pressing ice cream according to a further embodiment of the present invention and a container containing the frozen ice cream.

Meanwhile, FIG. 7 is an exploded perspective view of essential portions showing a connection structure between a pressing plate and a rotating shaft connected by an elastic coupler of the machine for shaving and pressing ice cream according to another embodiment of the present invention; FIG. 8 is a cross-sectional structural view of essential portions showing an assembled state of FIG. 7; FIG. 9 is a cross-sectional schematic view showing a connection structure between a pressing plate and a rotating shaft connected by an elastic coupler of the machine for shaving and pressing ice cream according to a further embodiment of the present invention and a container containing the frozen ice cream. Reference will now be made to another embodiment of a connection structure between a pressing plate and a rotating shaft, as essential portions of the machine for shaving and pressing ice cream according to the present invention.

In order for pressing pressure to be exerted against the pressing plate 140, a connection structure between the rotary motor 120 and the pressing plate 140 roughly includes: an elastic coupler 400; a shaft coupling hole 400a; a support coupling hole 400b; a spring 440; and a pressing plate support 410.

In the above connection structure between the rotary motor 120 and the pressing plate 140, particularly, the elastic coupler 400 is provided between the rotating shaft 130 connected with the rotary motor 120 and the pressing plate 140 rotated while pressing the frozen ice cream.

Further, the shaft coupling hole 400a is formed at an upper portion of the elastic coupler 400 to allow a lower portion of the rotating shaft 130 to be inserted and locked thereto.

Further, the support coupling hole 400b is formed at a lower portion of the elastic coupler 400 to allow the pressing plate 140 to be locked thereto by being inserted into the hole.

Further, the spring 440 is elastically provided in the support coupling hole 400b to elastically support the pressing plate 140.

Here, it is preferred that the spring 440 elastically provided in the support coupling hole 400b to elastically support the pressing plate 140 be in a form of a coil spring or a leaf spring.

Further, the pressing plate support 410 integrally extends at an upper portion of the pressing plate 140 rotated while pressing the frozen ice cream, so as to support the pressing plate 140.

Here, it is preferred that the pressing plate support 410 integrally extending from the pressing plate 140 to support the pressing plate 140 be configured to be inserted into the support coupling hole 400b formed at the lower portion of the elastic coupler 400, and fixed thereto by using a coupling pin 420.

In the above described connection structure between the rotary motor 120 and the pressing plate 140, particularly, the rotating shaft 130 connected with the rotary motor 120 is provided with a flat coupling portion 131 at each of opposite sides of a lower portion thereof, such that the rotating shaft is fixed to the elastic coupler 400 by using a coupling bolt B after the coupling portion 131 is closely engaged with the shaft coupling hole 400a of the elastic coupler 400.

Further, it is preferred that the elastic coupler 400 be formed with a longitudinally oblong hole 430 at each of opposite outer sides of the elastic coupler to communicate with the support coupling hole 400b, such that the pressing plate 140 along with the pressing plate support (410) is moveable up and down within a predetermined range.

Furthermore, as shown in FIG. 9, it is preferred that the pressing plate 140 pressing the frozen ice cream be provided with a plurality of pressing protrusions 141' at a lower portion thereof, so as to press a lower cover 351 of a container 300", the lower cover 351 being provided with a notch 352 on an outer circumferential surface thereof such that the lower cover 351 is separated from the container 300" containing the frozen ice cream by pressing pressure of the pressing plate 140.

Figure 10:
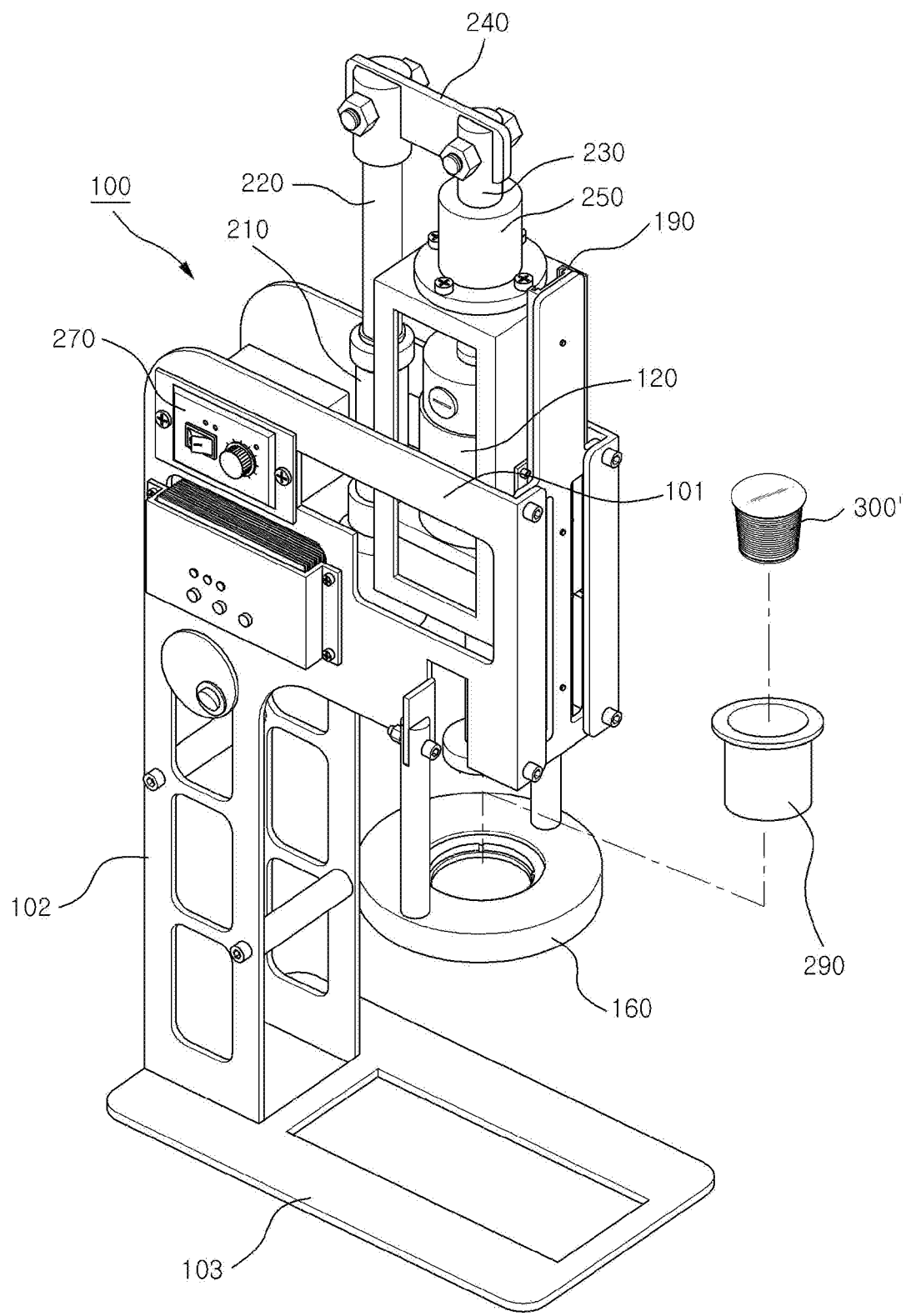
FIG. 10 is a schematic perspective view showing a state of ice cream pressed and dispensed by the machine for shaving and pressing ice cream of the present invention.

Meanwhile, FIG. 10 is a schematic perspective view showing a state of ice cream pressed and dispensed by the machine for shaving and pressing ice cream of the present invention. The machine for shaving and pressing ice cream includes: the above described body part 100; the guide means 110; the motor fixing case 170 with the rotary motor 120 provided therein, the rotary motor being configured such that the pressing plate 140 is mounted to the rotating shaft 130; the drive actuator 200; and the support plate 160, wherein a container support 290 opened at a lower portion thereof, such that the ice cream in the container is dispensed by being pressed is detachably provided in the support plate 160 that is fixedly connected to a lower portion of the mount part 101 such that the support plate is coaxially aligned with the pressing plate 140 and a container 300' containing ice cream is placed on the support plate, and here, the container support 290 receives the bellows type container 300' containing soft ice cream therein.

Accordingly, when the pressing plate 140 is moved down by operating only the drive actuator 200 in the state where the rotary motor 120 is stopped by the operation of the controller 270, it is possible to easily dispense semisolid soft ice cream in the container 300' through the lower portion of the container support 290 by the pressing plate 140 being moved down.

| Description of reference characters of important parts | |
|---|---|
| 100 . . . body part | 101 . . . mount part |
| 102 . . . support part | 103 . . . base plate |
| 110 . . . guide means | 120 . . . rotary motor |
| 130 . . . rotating shaft | 140 . . . pressing plate |
| 141 . . . pressing piece | 150 . . . blade |
| 160 . . . support plate | 170 . . . motor fixing case |
| 180 . . . vertically movable coupler | |
| 181 . . . guide rail | 190 . . . coupler support |
| 191 . . . rail channel | 200 . . . drive actuator |
| 210 . . . cylinder | 220 . . . bar |
| 230 . . . connecting bar | 240 . . . connecting piece |
| 250 . . . case connector | 260 . . . spring |
| 270 . . . controller | 280 . . . blade fixture |
| 290 . . . container support | |
| 300, 300', 300". . . container | S . . . pressure sensor |

The invention claimed is:

1. A machine for shaving and pressing ice cream, the machine comprising:
   a body part (100) constituted by a mount part (101) at an upper portion thereof, a support part (102) at a middle portion thereof, and a base plate (103) at a lower portion thereof;
   a guide means (110) provided at a front of the mount part (101);
   a motor fixing case (170) vertically slidably provided in the guide means (110), with a rotary motor (120) provided therein, the rotary motor being configured such that a pressing plate (140) is mounted to a rotating shaft (130) at a lower end of the rotating shaft;
   a drive actuator (200) provided at a second side of the motor fixing case (170), and configured to move up and down the motor fixing case with the rotary motor (120) provided therein;
   a support plate (160) fixedly connected to a lower portion of the mount part (101) such that the support plate is coaxially aligned with the pressing plate (140) and a container (300) containing ice cream is placed on the support plate;

a blade fixture (280) provided in the support plate (160), with a blade (150) provided therein so as to shave frozen ice cream contained in the container (300); and a controller (270) provided on an outer surface of the mount part (101) of the body part (100), and configured to control operation of the rotary motor (120) and the drive actuator (200).

2. The machine of claim 1, wherein the guide means (110) provided at the front of the mount part (101) is configured such that a first side surface of the motor fixing case (170) is provided with a vertically movable coupler (180) with a guide rail (181) provided at each of opposite sides thereof to longitudinally protrude, the front of the mount part (101) of the body part (100), as a first side of the vertically movable coupler (180), is integrally provided with a coupler support (190) with a rail channel (191) provided at each of opposite ends of the coupler support, and the vertically movable coupler (180) is coupled to the coupler support (190) such that the motor fixing case (170) is moved up and down.

3. The machine of claim 1, wherein a vertically movable coupler (180) is provided on each of opposite sides of the motor fixing case (170), as the guide means (110) provided at the front of the mount part (101), and a coupler support (190) is provided on each of opposite sides of the front of the body part (100) to be coupled with the vertically movable coupler (180).

4. The machine of claim 1, wherein the pressing plate (140) is provided with a protruding pressing piece (141) at a lower portion thereof so as to press and fix the container (300) receiving ice cream therein.

5. The machine of claim 1, wherein the drive actuator (200) is provided with a bar (220) extending at an upper portion thereof in a vertical direction, with a cylinder (210) interposed therebetween, and the motor fixing case (170) is provided with a connecting bar (230) extending at an upper portion thereof in a vertical direction, the connecting bar (230) being connected with the bar (220) of the drive actuator (200) through a connecting piece (240).

6. The machine of claim 1, wherein the motor fixing case (170) with the rotary motor (120) provided therein is provided with a protruding case connector (250) at an upper portion thereof, with a lower portion of the connecting bar (230) inserted into the case connector (250), to be elastically supported by a spring (260).

7. The machine of claim 6, wherein the connecting bar (230) elastically provided in the case connector (250) with the interposition of the spring (260) is provided with a pressure sensor (S) at a lower portion thereof, to transmit a signal to the controller (270) to stop driving the rotary motor (120) by sensing a change in pressing pressure upon completion of shaving the frozen ice cream.

8. The machine of claim 1, wherein the rotary motor (120) rotates the frozen ice cream in multiple stages by manipulation of the drive actuator (200), to obtain rough or soft and thin ice cream shavings desired by a user.

9. The machine of claim 1, wherein in order for pressing pressure to be exerted against the pressing plate (140), a connection structure between the rotary motor (120) and the pressing plate (140) includes:

an elastic coupler (400) provided between the rotating shaft (130) connected with the rotary motor (120) and the pressing plate (140) rotated while pressing the frozen ice cream;

a shaft coupling hole (400a) formed at an upper portion of the elastic coupler (400) to allow a lower portion of the rotating shaft (130) to be inserted and locked thereto;

a support coupling hole (400b) formed at a lower portion of the elastic coupler (400) to allow the pressing plate (140) to be locked thereto by being inserted into the hole (400b) at a pressing plate support (410);

a spring (440) elastically provided in the support coupling hole (400b) to elastically support the pressing plate (140); and the pressing plate support (410) integrally provided at an upper portion of the pressing plate (140) rotated while pressing the frozen ice cream to support the pressing plate (140).

10. The machine of claim 9, wherein the rotating shaft (130) connected with the rotary motor (120) is provided with a flat coupling portion (131) at each of opposite sides of a lower portion thereof, such that the rotating shaft is fixed to the elastic coupler (400) by using a coupling bolt (B) after the coupling portion (131) is closely engaged with the shaft coupling hole (400a) of the elastic coupler (400).

11. The machine of claim 9, wherein the pressing plate support (410) integrally extending from the pressing plate (140) to support the pressing plate (140) is configured to be inserted into the support coupling hole (400b) formed at the lower portion of the elastic coupler (400), and fixed thereto by using a coupling pin (420).

12. The machine of claim 9, wherein the elastic coupler (400) is formed with a longitudinally oblong hole (430) at each of opposite outer sides of the elastic coupler to communicate with the support coupling hole (400b), such that the pressing plate (140) along with the pressing plate support (410) is moveable up and down within a predetermined range.

13. The machine of claim 9, wherein the spring (440) elastically provided in the support coupling hole (400b) to elastically support the pressing plate (140) is in a form of a coil spring or a leaf spring.

14. The machine of claim 9, wherein the pressing plate (140) pressing the frozen ice cream is provided with a plurality of pressing protrusions (141') at a lower portion thereof, so as to press a lower cover (351) of a container (300"), the lower cover (351) being provided with a notch (352) on an outer circumferential surface thereof such that the lower cover (351) is separated from the container (300") containing the frozen ice cream by pressing pressure of the pressing plate (140).

15. A machine for shaving and pressing ice cream, the machine comprising:

a body part (100) constituted by a mount part (101) at an upper portion thereof, a support part (102) at a middle portion thereof, and a base plate (103) at a lower portion thereof;

a guide means (110) provided at a front of the mount part (101);

a motor fixing case (170) vertically slidably provided in the guide means (110), with a rotary motor (120) provided therein, the rotary motor being configured such that a pressing plate (140) is mounted to a rotating shaft (130) at a lower end of the rotating shaft;

a drive actuator (200) provided at a second side of the motor fixing case (170), and configured to move up and down the motor fixing case with the rotary motor (120) provided therein;

a support plate (160) fixedly connected to a lower portion of the mount part (101) such that the support plate is coaxially aligned with the pressing plate (140) and a container (300) containing ice cream is placed on the support plate;

a container support (290) detachably provided in the support plate (160), and configured to receive a container (300') containing soft ice cream therein while being placed in the support plate (160) and to be opened at a lower portion thereof, such that the ice cream in the container is dispensed by being pressed; and a controller (270) provided on an outer surface of the mount part (101) of the body part (100), and configured to control operation of the rotary motor (120) and the drive actuator (200).

16. The machine of claim 15, wherein the container support (290) receives the bellows type container (300') containing the soft ice cream therein, such that the ice cream is dispensed by the pressing plate (140) pressing the bellows type container.

17. The machine of claim 15, wherein the guide means (110) provided at the front of the mount part (101) is configured such that a first side surface of the motor fixing case (170) is provided with a vertically movable coupler (180) with a guide rail (181) provided at each of opposite sides thereof to longitudinally protrude, the front of the mount part (101) of the body part (100), as a first side of the vertically movable coupler (180), is integrally provided with a coupler support (190) with a rail channel (191) provided at each of opposite ends of the coupler support, and the vertically movable coupler (180) is coupled to the coupler support (190) such that the motor fixing case (170) is moved up and down.

18. The machine of claim 15, wherein a vertically movable coupler (180) is provided on each of opposite sides of the motor fixing case (170), as the guide means (110) provided at the front of the mount part (101), and a coupler support (190) is provided on each of opposite sides of the front of the body part (100) to be coupled with the vertically movable coupler (180).

19. The machine of claim 15, wherein the drive actuator (200) is provided with a bar (220) extending at an upper portion thereof in a vertical direction, with a cylinder (210) interposed therebetween, and the motor fixing case (170) is provided with a connecting bar (230) extending at an upper portion thereof in a vertical direction, the connecting bar (230) being connected with the bar (220) of the drive actuator (200) through a connecting piece (240).

* * * * *